(12) United States Patent
Numata

(10) Patent No.: US 9,102,203 B2
(45) Date of Patent: Aug. 11, 2015

(54) PNEUMATIC TIRE

(75) Inventor: Kazuki Numata, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 468 days.

(21) Appl. No.: 13/153,962

(22) Filed: Jun. 6, 2011

(65) Prior Publication Data

US 2011/0308680 A1    Dec. 22, 2011

(30) Foreign Application Priority Data

Jun. 17, 2010    (JP) .................................. 2010-138562

(51) Int. Cl.
- *B60C 11/14* (2006.01)
- *B60C 11/16* (2006.01)
- *B60C 11/03* (2006.01)
- *B60C 11/12* (2006.01)

(52) U.S. Cl.
CPC ......... *B60C 11/0318* (2013.04); *B60C 11/1625* (2013.04); *B60C 11/0302* (2013.04); *B60C 11/12* (2013.01)

(58) Field of Classification Search
USPC ........................ 152/209.2, 209.3, 209.17, 211
IPC ............................................. B60C 11/14,11/16
See application file for complete search history.

(56) References Cited

U.S. PATENT DOCUMENTS

| | | | | |
|---|---|---|---|---|
| 3,991,802 A | * | 11/1976 | Yokota et al. | ................... 152/210 |
| 4,690,189 A | * | 9/1987 | Bradisse et al. | ......... 152/209.15 |
| 4,721,141 A | * | 1/1988 | Collette et al. | ............. 152/209.2 |
| 2010/0269967 A1 | * | 10/2010 | Maruoka | ................. 152/209.16 |

FOREIGN PATENT DOCUMENTS

| | | | | |
|---|---|---|---|---|
| EP | 1129869 A2 | * | 9/2001 | .............. B60C 11/16 |
| EP | 1 637 358 A1 | | 3/2006 | |
| JP | 2007050718 A | * | 3/2007 | .............. B60C 11/16 |

OTHER PUBLICATIONS

Machine translation of EP 1129869, 2001.*

* cited by examiner

*Primary Examiner* — Justin Fischer
*Assistant Examiner* — Philip N Schwartz
(74) *Attorney, Agent, or Firm* — Birch, Stewart, Kolasch & Birch, LLP

(57) ABSTRACT

A pneumatic tire provided with a tread pattern, wherein a tread half which is one half of the tread pattern on each side of the tire equator is made up of repeat design units arranged circumferentially of the tire. The repeat design units have at least two different circumferential pitch lengths, and the repeat design units are each provided with at least one stud hole.

11 Claims, 5 Drawing Sheets

PNEUMATIC TIRE

BACKGROUND OF THE INVENTION

The present invention relates to a pneumatic tire provided with stud holes, more particularly to a combination of a tread pattern and an arrangement of stud holes (or studs) capable of improving snow and ice performances as well as noise performance.

In order to improve running performance on snowy roads, pneumatic tires provided with metal studs are widely used. In such studded pneumatic tires, the arrangement of the studs has been designed, attaching importance to the running performance on snowy roads, but almost out of consideration of the noise generated by the studs.

SUMMARY OF THE INVENTION

It is therefore, an object of the present invention to provide a pneumatic tire in which, by specifically arranging stud holes (or studs), noise performance affected by the studs as well as on-the-snow performance and on-the-ice performance can be improved.

According to the present invention, a pneumatic tire comprises a tread portion provided with a tread pattern wherein a tread half which is one half of the tread pattern on each side of the tire equator comprises shoulder blocks formed between each tread edge and an axially outermost shoulder circumferential groove adjacent thereto and circumferentially divided by shoulder axial grooves, the above-mentioned tread half is made up of repeat design units arranged circumferentially of the tire wherein the repeat design units are defined by
a circumferential-direction line drawn at the tire equator,
a circumferential-direction line drawn at the tread edge, and
pitch boundary lines drawn perpendicularly to the tire equator, passing through intersecting points of edges of said shoulder axial grooves on one side in a tire circumferential direction with the above-mentioned shoulder circumferential groove, the above-mentioned repeat design units have at least two different circumferential pitch lengths, and the repeat design units are each provided with at least one stud hole for attaching a stud.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The undermentioned normally inflated loaded condition is such that the tire is mounted on the standard wheel rim and inflate to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used. The standard pressure and the standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. The standard load is the "maximum load capacity" in JATMA, the "Load Capacity" in ETRTO, the maximum value given in the above-mentioned table in TRA or the like. In case of passenger car tires, however, the standard pressure and standard tire load are uniformly defined by 180 kPa and 88% of the maximum tire load, respectively.

The tread width TW is the axial distance between the tread edges $2t$ measured in the normally inflated unloaded condition of the tire.

The tread edges $2t$ are the axial outermost edges of the ground contacting patch (camber angle=0) in the normally inflated loaded condition.

Description of the Preferred Embodiments

Embodiments of the present invention will now be described in detail in conjunction with the accompanying drawings.

The pneumatic tire 1 according to the present invention comprises a tread portion 2, a pair of sidewall portions and a pair of bead portions, and the tire 1 reinforced by a carcass and a tread belt as usual. In this embodiment, the tire 1 is a radial tire for passenger cars.

The tread portion 2 is provided with tread grooves defining a tread pattern.

Figure 1:
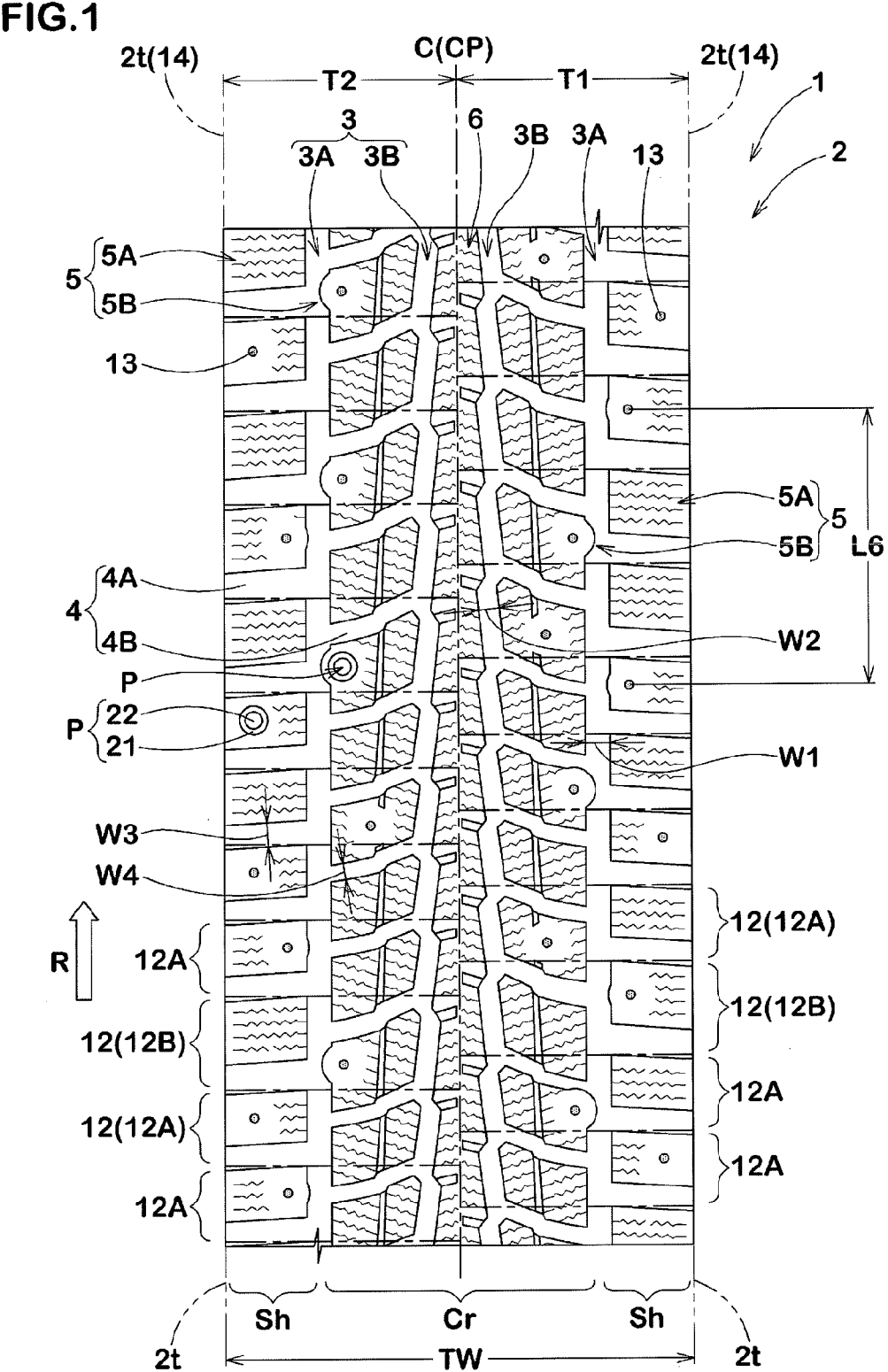
FIG. 1 is a developed view of a tread portion of a pneumatic tire according to the present invention showing a tread pattern.
Figure 2:
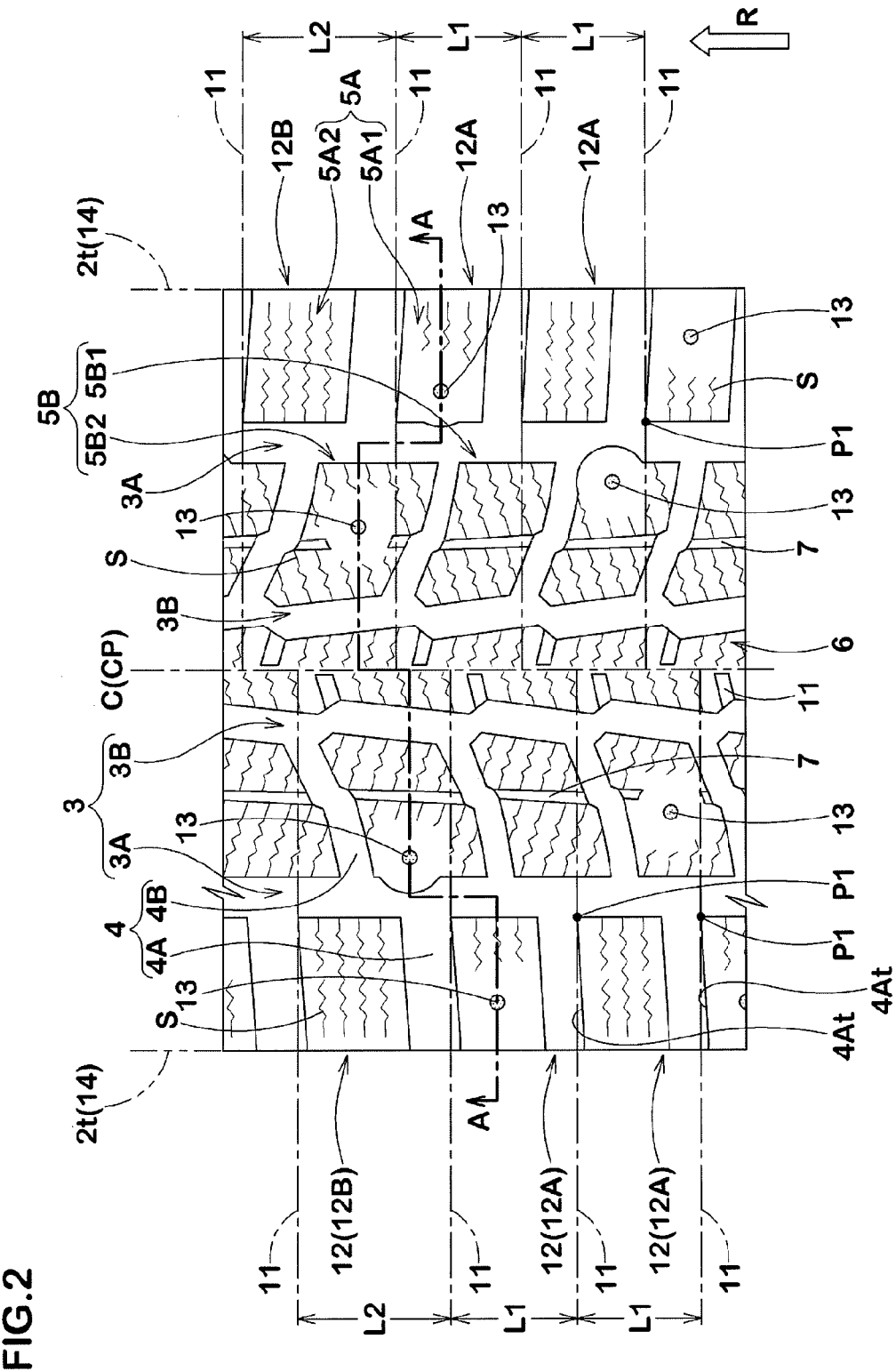
FIG. 2 is an enlarged view of a part of the tread pattern shown in FIG. 1.

In FIG. 1 showing an example of the tread pattern, the tread grooves include: a plurality of circumferential grooves 3 extending continuously in the tire circumferential direction; and a plurality of axial grooves 4 arranged at intervals in the tire circumferential direction and each intersecting at least one of the circumferential grooves 3.

The tread portion 2 is therefore, divided into rows of blocks 5 axially separated by the circumferential grooves 3 and circumferentially separated by the axial grooves 4.

The tread pattern in this example is a unidirectional pattern which is mirror symmetric about the tire equator C, except that a right half tread pattern in a right tread half T1 on one side of the tire equator C is circumferentially shifted from a left half tread pattern in a left tread half T2 on the other side of the tire equator C.

The circumferential grooves 3 include
a crown circumferential groove 3B disposed on each side of the tire equator C, and
a shoulder circumferential grooves 3A disposed axially outside the crown circumferential groove 3B as the axially outermost circumferential groove. Thus, at least four circumferential grooves are disposed.

As another example of the tread pattern, it is possible that only one crown circumferential groove 3B is disposed on the tire equator C. Thus, three circumferential grooves are disposed.

It is possible to configure the shoulder circumferential grooves 3A to have a nonlinear configuration for example a zigzag configuration or smoothly curved wavy configuration. In this example, however, the shoulder circumferential grooves 3A each extend substantially straight along a circumferential-direction line in order to increase the lateral stiffness of the blocks 5 adjacent to the shoulder circumferential grooves 3A and thereby to improve steering stability during cornering.

In the case of a passenger car tire as in this embodiment, the groove width W1 of the shoulder circumferential groove 3A is preferably set in a range of not less than 2%, more preferably not less than 3%, but not more than 9%, more preferably not more than 6% of the above-mentioned tread width TW. Thereby, self-ejecting of snow packed in the grooves is ensured while maintaining a ground contacting area necessary for running on ice roads.

For the similar reasons, the groove depth of the shoulder circumferential groove 3A is preferably set in a range of not less than 5 mm, more preferably not less than 6 mm, but not more than 10 mm, more preferably not more than 9 mm.

On the other hand, it is possible to configure the crown circumferential grooves 3B to have a linear configuration or a smoothly curved wavy configuration. In this example, however, the crown circumferential groove 3B extends zigzag in the tire circumferential direction in order to increase the axial components of the edges of the crown circumferential groove 3B. And the groove width W2 and groove depth of the crown circumferential groove 3B are set in the same ranges as the shoulder circumferential groove 3A. Therefore, road grip performance on icy road surfaces and snowy road surfaces can be improved.

In this example, in order to reduce noise while providing good road grip, a circumferentially continuously extending center rib 6 is formed between the crown circumferential grooves 3B, along the tire equator C. And each edge of the center rib 6 is provided with slots 11 at intervals in the tire circumferential direction. The slots 11 extend from the edges of the rib but terminate within the rib, specifically near but before the center line (C). Thereby, the circumferential rigidity of the center rib 6 is appropriately mitigated and uneven wear may be reduced.

The above-mentioned axial grooves 4 include:
shoulder axial grooves 4A extending between the tread edges 2t and the shoulder circumferential grooves 3A; and
middle axial grooves 4B extending between the crown circumferential grooves 3B and shoulder circumferential grooves 3A.

The shoulder axial grooves 4A are extended at an angle of not more than 10 degrees with respect to the tire axial direction in order to almost maximize the axial components of the groove edges and thereby to improve on-the-ice performance and on-the-snow performance.

Preferably, the groove width W3 and groove depth of the shoulder axial groove 4A are set to be equal to or slightly less than the groove width W1 and groove depth of the shoulder circumferential groove 3A, respectively.

The middle axial grooves 4B are inclined to the opposite direction to the intended rotational direction R of the tire from the crown circumferential groove 3B towards the shoulder circumferential groove 3A in order to increase the circumferential components of the edges of the blocks 5 and thereby to improve on-the-snow performance and on-the-ice performance during cornering.

Preferably, the groove width W4 and groove depth of the middle axial groove 4B are set to be equal to or slightly less than the groove width W1 and groove depth of the shoulder circumferential groove 3A, respectively.

On each side of the tire equator C, the total number of the middle axial grooves is equal to the total number of the shoulder axial grooves.

The blocks 5 include:
shoulder blocks 5A which are axially defined by the shoulder circumferential grooves 3A and the tread edges 2t and circumferentially defined by the shoulder axial grooves 4A; and
middle blocks 5B which are axially defined by the shoulder circumferential grooves 3A and the crown circumferential grooves 3B and circumferentially defined by the middle axial grooves 4B.

The shoulder blocks 5A each have an axially-long substantially-rectangular configuration.

In this example, the shoulder blocks 5A include first shoulder blocks 5A1 and second shoulder blocks 5A2 having a circumferential dimension larger than that of the first shoulder block 5A in order to increase the lateral stiffness and thereby to improve the cornering performance.

The middle blocks 5B each have a substantially parallelogram configuration inclined to the opposite direction to the intended rotational direction R of the tire from the crown circumferential groove 3B towards the shoulder circumferential groove 3A.

In this example, the middle blocks 5B include first middle blocks 5B1 and second middle blocks 5B2 having a circumferential dimension larger than that of the first middle block 5B1.

The middle blocks 5B are provided in their axial central portions with narrow grooves 7 extending in the tire circumferential direction in order to improve drainage.

The shoulder blocks 5A are each provided with a plurality of zigzag sipe S which are substantially parallel to the shoulder axial grooves 4A. The middle blocks 5B are each provided with a plurality of zigzag sipes S which are inclined oppositely to the middle axial grooves 4B. Therefore, the shoulder blocks 5A can make elastic deformation to increase the contact between the blocks and icy roads. Further, during cornering, the edges of the middle blocks 5B located on the outside about the center of cornering make an effect on the improvement of cornering performance on icy roads. Furthermore, the sipes S soak up water existing between the tread portion and icy road surface to improve the ice grip performance. Thus, on-the-ice performance can be improved.

The right half tread pattern in the right tread half T1 and the left half tread pattern in the left tread half T2 are each formed by circumferentially arranging a plurality of repeat design units 12.

One repeat design unit 12 is defined by a circumferential-direction line 14 drawn at one of the tread edges 2t, a circumferential-direction line drawn at the tire equator C, and two pitch boundary lines 11.

The pitch boundary lines 11 can be defined by axial-direction lines which are drawn perpendicular to the tire equatorial plane CP, passing through corresponding points P1 (relative to the respective shoulder blocks 5A or respective shoulder axial grooves 4A), for example, intersecting points P1 of edges of the shoulder axial grooves 4A on the same side in the tire circumferential direction (in this embodiment, the toe-side edges 4At in the tire rotational direction R) with the axially outer edge of the shoulder circumferential groove 3A.

The repeat design units 12 have at least two, preferably at most seven different circumferential pitch lengths.

Therefore, the repeat design units 12 include at least:

a first repeat design unit 12A having the smallest circumferential pitch length L1; and a second repeat design unit 12B having a circumferential pitch length L2 more than the length L1.

Between the repeat design units having different circumferential pitch lengths, at least one of the groove width of the shoulder axial groove 4A and the circumferential pitch length of the shoulder block 5A is changed.

Each of the repeat design units 12A and 12B is provided with at least one stud hole 13 to which a stud P can be attached by insertion. (In FIG. 1, the studs P are attached to two of the stud holes 13 on the left side of the figure)

Figure 5:
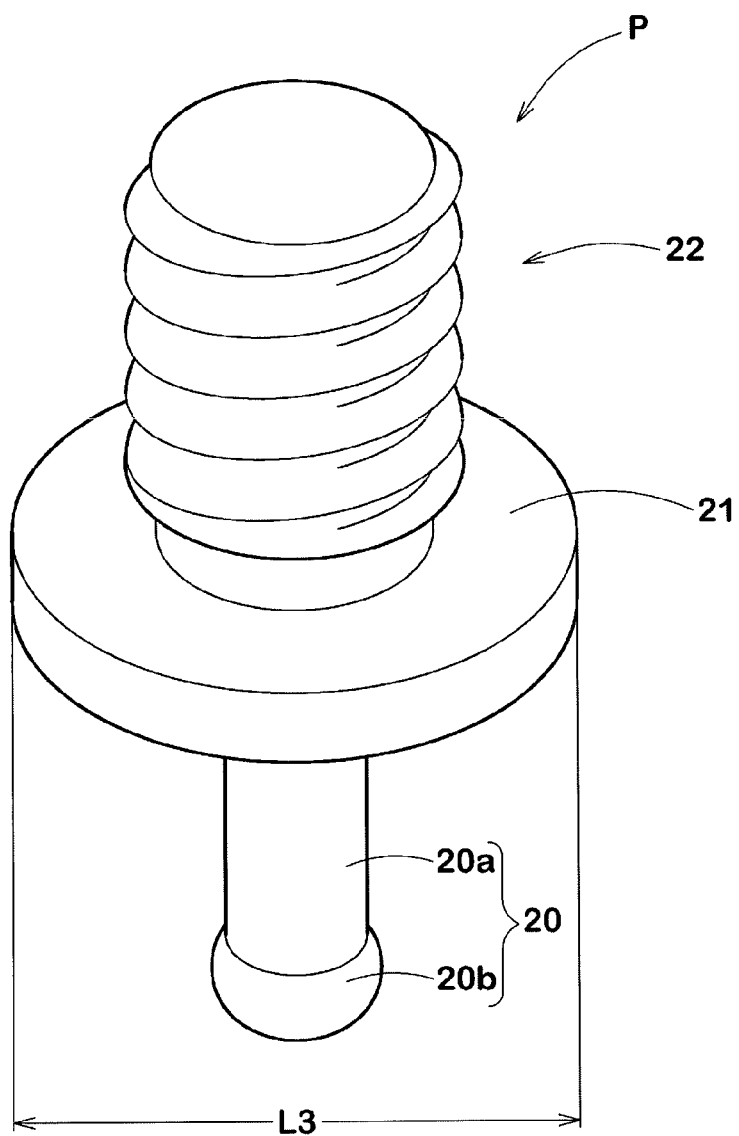
FIG. 5 is an enlarged perspective view of a stud.

The stud P is as shown in FIG. 5, composed of a flange 21 contacting with the block top surface, an anchor portion 20 protruding from the flange and inserted in the stud hole 13, and a main portion 22 protruding from the flange to the opposite direction to the anchor portion 20 to engage with the ground.

The main portion 22 is preferably threaded to increase the friction with the ground.

The anchor portion 20 is composed of an equidiameter cylindrical portion 20a having a substantially constant diameter, and a large-diameter portion 20b at the end thereof having a diameter larger than the equidiameter portion 20a. The large-diameter portion 20b in this example is spherical.

In order to assure the fixation of the stud P, for example an adhesive agent can be applied between the surfaces of the anchor portion 20 and the stud hole 13.

The hardness of the tread rubber provided with the stud holes 13 is preferably set in a range of not less than 60 degrees, more preferably not less than 63 degrees, but not more than 70 degrees, more preferably not more than 67 degrees when measured at a temperature of 23 deg. C with a type A durometer according to the Japanese Industrial Standards K6253.

If the hardness is less than 60 degrees, there is a possibility that the studs P are easily dropped out. If the hardness is more than 70 degrees, it is difficult to improve the ice grip performance.

The stud hole 13 is a circular hole having a depth D in a range of from 8 to 12 mm, and a diameter d in a range of from 2 to 3 mm which is substantially equal to the diameter of the equidiameter portion 20a of the anchor portion 20 of the stud.

Figure 3:
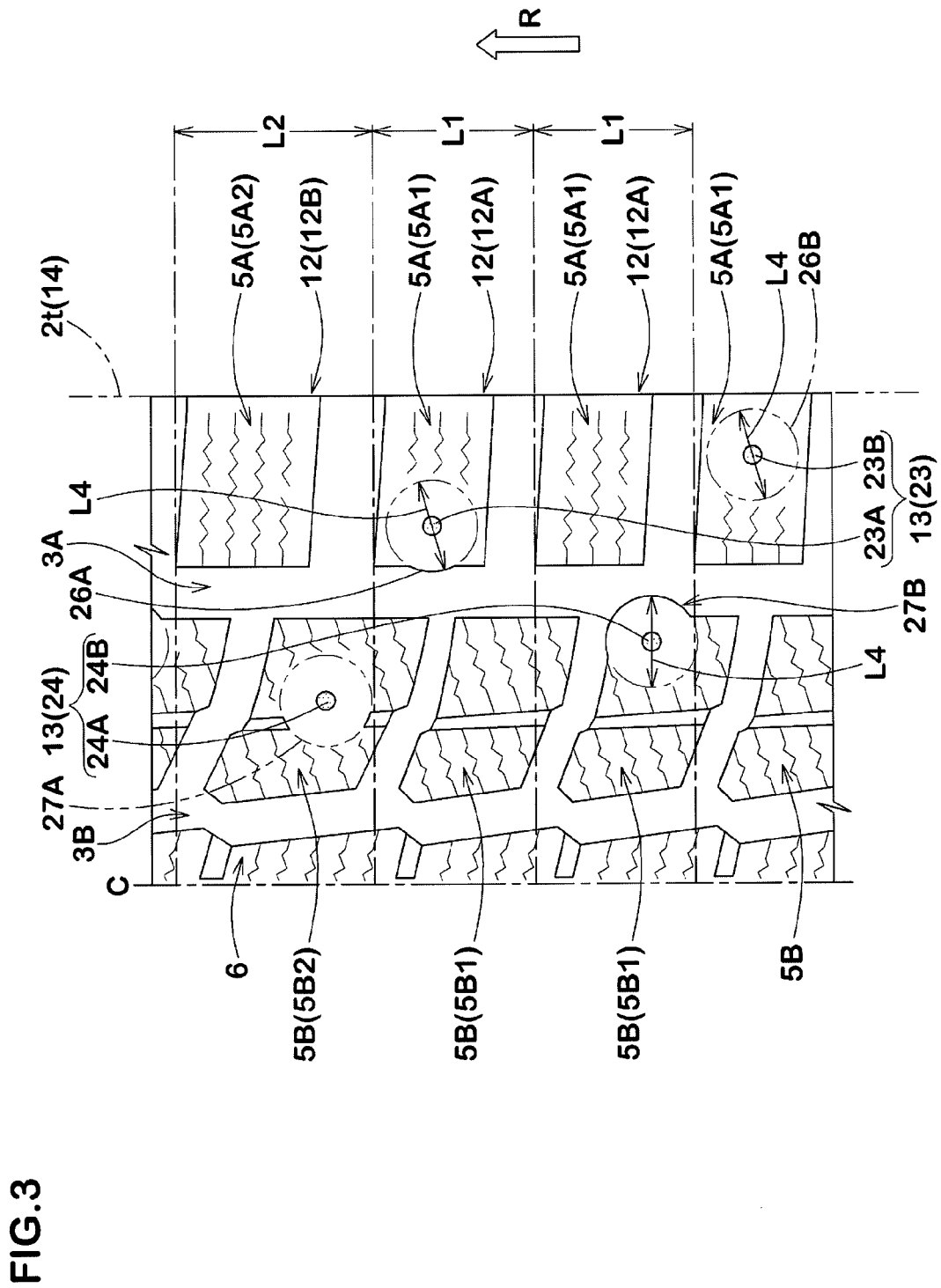
FIG. 3 is an enlarged view of a part of the tread pattern shown in FIG. 1.

In this embodiment as shown in FIG. 3, the stud holes 13 are shoulder stud holes 23 disposed on the shoulder blocks 5A and middle stud holes 24 disposed on the middle blocks 5B.

The shoulder stud holes 23 include inner shoulder stud holes 23A and outer shoulder stud holes 23B positioned axially outside the inner shoulder stud holes 23A.

The inner shoulder stud holes 23A are each disposed in an axial inner part of one of the shoulder blocks 5A. More specifically, the center of the hole 23A is positioned axially inside the axial intermediate position of the shoulder block 5A.

In order to receive the flange 21 of the stud and reinforce the surrounding part of the stud hole, the shoulder block 5A with the inner shoulder stud hole 23A is provided with an inner shoulder reinforcing part 26A provided with no sipe and no groove.

The inner shoulder reinforcing part 26A is a circular region of a diameter L4 more than the diameter L3 of the flange 21 of the stud P centered on the center of the inner shoulder stud hole 23A.

In this example, the inner shoulder reinforcing part 26A protrudes axially inwardly into the shoulder circumferential groove 3A, and the edge of this protruding part of the inner shoulder reinforcing part 26A is an arc of a circle of the diameter L4.

The diameter L4 is preferably not less than 14 mm, more preferably not less than 15 mm, but not more than 18 mm, more preferably not more than 17 mm.

The outer shoulder stud holes 23B are each disposed in an axial outer part of one of the shoulder blocks 5A. More specifically, the center of the hole 23B is positioned axially outside the axial intermediate position of the shoulder block 5A.

As explained, to receive the flange 21 and reinforce the surrounding part of the stud hole, the shoulder block 5A with the outer shoulder stud hole 23B is also provided with an outer shoulder reinforcing part 26B. The outer shoulder reinforcing part 26B is a circular region of the diameter L4 provided with no sipe and no groove. The outer shoulder reinforcing part 26B is centered on the outer shoulder stud hole 23B.

The middle stud holes 24 include inner middle stud holes 24A and outer middle stud holes 24B disposed axially outside the inner middle stud holes 24A.

The inner middle stud holes 24A are each disposed on one of the middle block 5B so that the center thereof is positioned near or at the axial intermediate position of the middle block 5B, more specifically within a range of 10% of the axial width of the middle block 5B from the axial intermediate position of the middle block 5B toward each sides thereof (namely within 20% range).

Similarly to the above, the middle block 5B is provided around the inner middle stud hole 24A with an inner middle reinforcing part 27A which is a circular region of the diameter L4 provided with no sipe and no groove and centered on the center of the inner middle stud hole 24A.

The outer middle stud holes 24B are each disposed on one of the middle blocks 5B so that the center thereof is positioned axially outside the axial intermediate position of the middle block 5B.

Similarly, the middle block 5B is provided around the outer middle stud hole 24B with an outer middle reinforcing part 27B which is a circular region of the diameter L4 provided with no sipe and no groove and centered on the center of the outer middle stud hole 24B.

In this example, the outer middle reinforcing part 27B protrudes axially outwardly from the axial outer edge of the middle block 5B into the adjacent shoulder circumferential groove 3A, slightly decreasing the groove width.

As the tire rotates, contact between the studs P and the ground occur at different axial positions. Further, the studs P are arranged at irregular intervals in the tire circumferential direction. Therefore, the noise due to the contact is temporally-dispersed, and the noise performance can be improved.

As the repeat design units 12 have at least two different circumferential pitch lengths, tread pattern noise can be reduced and the noise performance is further improved.

As the stud holes 13 in this embodiment include shoulder stud holes 23 and middle stud holes 24, the studs P are arranged widely in the tire axial direction, and as a result, on-the-snow performance and on-the-ice performance of the tire during straight running and cornering can be improved.

In each of the right and left tread halves T1 and T2, the number of the repeat design units 12 around the tire is preferably not less than 50, more preferably not less than 56, still more preferably not less than 58, but not more than 70, more preferably not more than 64, still more preferably not more than 62. In this example, this number corresponds to the number of the shoulder block 5A.

If the number of the repeat design units 12 is less than 50, it becomes difficult to reduce pattern noise. If the number of the repeat design units 12 is more than 70, it becomes difficult to make a tire vulcanizing mold.

The circumferential pitch length L2 of the second repeat design unit 12B is preferably not less than 1.1 times, more preferably not less than 1.2 times, but not more than 1.8 times, more preferably not more than 1.7 times the circumferential pitch length L1 of the first repeat design unit 12A.

If the length L2 is less than 1.1 times the length L1, it becomes difficult to spread the noise into a wide frequency range. If the length L2 is more than 1.8 times the length L1, as the rigidity difference between the repeat design units increase, and uneven wear is liable to occur.

In the case that the number of the repeat design units 12 having different pitch lengths is more than two, this limitation can be applied to every two repeat design units 12 having adjacent pitch lengths, that is, the ratio Lb/La of a circumferential pitch length La and the next longer circumferential pitch length Lb is preferably not less than 1.1, more preferably not less than 1.2, but not more than 1.8, more preferably not more than 1.7

The number of the repeat design units 12 provided with only one stud hole 13 is preferably not less than 90%, more preferably not less than 95%, most preferably 100% of the number of all of the repeat design units 12.

If less than 90%, it becomes difficult to effectively reduce the pattern noise, and there is a possibility that the noise performance can not be improved.

In the tread portion 2 in this example, as shown in FIG. 1, the right tread half T1 and the left tread half T2 are circumferentially shifted from each other.

Excepting this circumferential shift, the right tread half T1 and the left tread half T2 are not exactly symmetric about the tire equator C due to the formation of the stud holes and the shoulder reinforcing parts 26A and 26B and middle reinforcing parts 27A and 27B, but essentially symmetric if such parts 26A, 26B, 27A and 27B are disregarded.

It is of course possible to arrange the right tread half T1 and the left tread half T2 without such a circumferential shift. But, a shift of about one half of the circumferential pitch length is preferred because the traction on the snowy roads during straight running is improved. Further, as the stud holes 13 are circumferentially shifted, the noise due to the studs P is spread.

If the stud holes and the reinforcing parts 26A, 26B, 27A and 27B are disregarded, all of the repeat design units on the tread half T1, T2 are identical except that the circumferential pitch length is varied, in other words, the difference between the repeat design units having different circumferential pitch lengths is such that the repeat design unit is elongated or shortened only in the tire circumferential direction by the same rate throughout the repeat design unit.

In order to effectively spread the noise into a wide frequency range, the number To of the stud holes 13 in one of the tread halves T1 and T2 ((for example left tread half T2) can be increased up to 1.1 times, preferably up to 1.05 times the number Ti of the stud holes 13 in the other tread half (for example right tread half T1). Namely, the ratio To/Ti is not more than 1.1, preferably not more than 1.05, but not less than 1.0 times.

It is preferable to design the tire 1 such that the average ground pressure Psh of the shoulder regions Sh is more than the average ground pressure Pcr of the crown region Cr.

The average ground pressure is determined under the normally inflated loaded condition by the use of the tire from which all of the studs are removed.

The average ground pressure Psh of the shoulder regions Sh is the average of the contact pressure of the shoulder blocks 5A. The average ground pressure Pcr of the crown region Cr is the average of the contact pressure of the middle blocks 5B and center rib 6.

Figure 4:
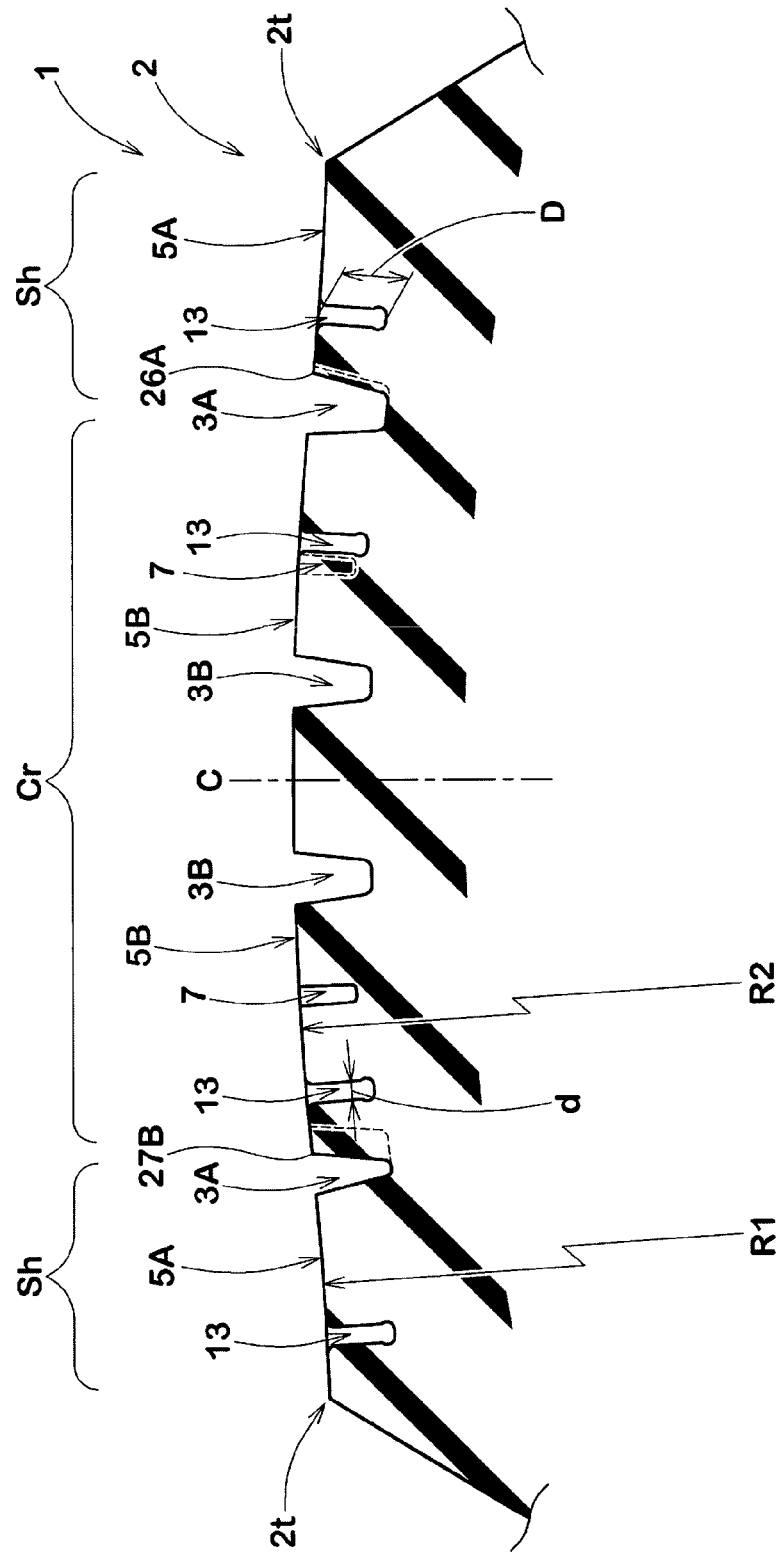
FIG. 4 is a cross sectional view of the tread portion taken along line A-A in FIG. 2.

In order to make the average ground pressure Psh of the shoulder regions sh more than the average ground pressure Pcr of the crown region Cr, for example, the following designs (1) and/or (2) can be employed:
(1) in the contour shape of the tread face in the tire meridian section, the radius of curvature R1 of the shoulder regions sh is set to be more than the radius of curvature R2 of the crown region Cr as shown in FIG. 4;
(2) the thickness of the tread rubber is relatively increased in the shoulder regions Sh.

If the average ground pressure Psh is less than 1.2 times the average ground pressure Pcr, the ground pressure difference between the shoulder regions sh and crown region Cr decreases, and there is a possibility that on-the-snow performance and on-the-ice performance can not be fully improved. If the average ground pressure Psh is more than 1.4 times the average ground pressure, the ground pressure difference between the shoulder regions Sh and crown region Cr is excessively increased, and the studs P in the crown region Cr do not function well, therefore, there is a possibility that on-the-snow performance, on-the-ice performance and noise performance can not be fully improved.

Therefore, the average ground pressure Psh of the shoulder regions Sh is preferably set in a range of not less than 1.2 times, more preferably not less than 1.25 times, but not more than 1.4 times, more preferably not more than 1.35 times the average ground pressure Pcr of the crown region Cr.

In order to efficiently improve cornering performance on snowy roads, it is preferred that the number of the studs P (stud holes) disposed in both of the shoulder regions sh where the ground pressure is higher is more than the number of the studs P (stud holes) disposed in the crown region Cr.

For example, the number Ts of the shoulder stud holes 23 is preferably more than 1.0 times, more preferably not less than 1.05 times the number Tm of the middle stud holes 24.

If the shoulder stud holes 23 are excessively increased, stability during straight running is liable to deteriorate. Therefore, the number Ts of the shoulder stud holes 23 is preferably not more than 1.2 times, more preferably not more than 1.15 times the number Tm of the middle stud holes 24.

The number Tsi of the inner shoulder stud holes 23A is preferably not less than 1.0 times, more preferably not less than 1.05 times, but not more than 1.2 times, more preferably not more than 1.15 times the number Tso of the outer shoulder stud holes 23B.

If the number Tsi is less than 1.0 times the number Tso, the noise due to contact between the studs P and the road surface is liable to increase. If the number Tsi is increased over 1.2 times the number Tso, the drive power and braking force can not be increased correspondingly because the percentage of the number of studs scratching the same position increases.

It is preferable that the inner shoulder stud holes 23A and outer shoulder stud holes 23B are alternately arranged in the tire circumferential direction in each tread half T1, T2 so that the circumferential adjacent studs P alternately scratch axially different positions to improve on-the-snow performance and on-the-ice performance in a well balanced manner.

The number Tmo of the outer middle stud holes 24B is preferably set in a range of not less than 1.0 times, more preferably not less than 1.05 times, but not more than 1.2 times, more preferably not more than 1.15 times the number Tmi of the inner middle stud holes 24A.

If the number Tmo is less than 1.0 times the number Tmi, the outer middle stud holes 24B excessively decreased in number, therefore, there is a possibility that it becomes difficult to provide the improved drive power and braking force on the snowy roads. If the number Tmo is more than 1.2 times the number Tmi, the circumferential adjacent studs P are liable to scratch the same position.

The inner middle stud holes 24A and outer middle stud holes 24B may be arranged alternately in the tire circumferential direction.

The number Tsi of the inner shoulder stud holes 23A is preferably not less than 1.0 times, more preferably not less than 1.05 times, but not more than 1.2 times, more preferably not more than 1.15 times the number Tmo of the outer middle stud holes 24B.

If the number Tsi is less than 1.0 times the number Tmo, the number of the studs P in the shoulder regions sh where the ground pressure increases during cornering becomes insufficient. If more than 1.2 times, noise performance is liable to deteriorate.

It is preferable that as shown in FIG. 1, the circumferential pitch L6 between the circumferentially adjacent stud holes 13 is varied along the tire circumferential direction. Thereby, the frequency range of the noise due to the contact between the studs P and the road surface can be further spread, and the noise performance can be further improved.

Comparison Tests

Based on the tread pattern shown in FIG. 1, pneumatic tires having repeat design units whose specifications are shown in Table 1 were prepared and tested as follows.
Common specifications are as follows.
   tire size: 205/55R16 (rim size: 7.0J×16)
   tread width Tw: 175 mm
   tread rubber hardness: 65 degrees
   average ground pressure Psh in shoulder regions: 450 kPa
   average ground pressure Pcr in crown region: 350 kPa
   number of repeat design units in a tread half: 64
<On-The-Snow Performance Test>

Test tires were mounted on four wheels of a 2000 cc passenger car (tire pressure, front=200 kPa, rear=220 kPa) and run on a snow covered road of a tire test course.
Based on the straight running stability and cornering performance, on-the-snow performance was evaluated into ten ranks by a test driver, wherein Ref. 1 is rank five, and the larger the rank number, the better the performance.
The results are shown in Table 1.
<On-The-Ice Performance Test>

Further, the test car was run on ice-covered road, and the braking distance was measured when four-wheel lock braking was made during running at 30 km/h.

The results are indicated in Table 1 by an index based on Ex. 1 being 100, wherein the larger the value, the shorted the braking distance.
<Noise Performance Test>

During running on the snow covered road at 80 km/h, the overall noise level dB(A) was measured at a position corresponding to the left (inside) ear of the driver. The results are shown in Table 1. When noise level is under 68.5 dB(A), noise performance is considered as being good.

It was confirmed from the test results that the tires according to the present invention can be improved in the on-the-snow performance, on-the-ice performance and noise performance.

TABLE 1

| Tire | Ref.1 | Ex.1 | Ex.2 | Ex.3 | Ex.4 | Ex.5 | Ex.6 | Ex.7 |
|---|---|---|---|---|---|---|---|---|
| variation of Pitch length | non | *1 | *1 | *1 | *1 | *1 | *1 | *1 |
| Number Ts of Shoulder stud holes | 69 | 69 | 66 | 70 | 66 | 69 | 66 | 66 |
| Number Tm of Middle stud holes | 59 | 59 | 62 | 58 | 62 | 59 | 62 | 62 |
| Ts/Tm | 1.17 | 1.17 | 1.06 | 1.21 | 1.06 | 1.17 | 1.06 | 1.06 |
| Number Tsi of Inner shoulder stud holes | 35 | 35 | 34 | 36 | 33 | 36 | 34 | 34 |
| Number Tso of Outer shoulder stud holes | 34 | 34 | 32 | 34 | 33 | 30 | 32 | 32 |
| Tsi/Tso | 1.03 | 1.03 | 1.06 | 1.06 | 1.00 | 1.20 | 1.06 | 1.06 |
| Number Tmi of Inner middle stud holes | 27 | 27 | 30 | 27 | 30 | 30 | 31 | 28 |
| Number Tmo of Outer middle stud holes | 32 | 32 | 32 | 31 | 32 | 32 | 31 | 34 |
| Tmo/Tmi | 1.19 | 1.19 | 1.07 | 1.15 | 1.07 | 1.07 | 1.00 | 1.21 |
| Tsi/Tmo | 1.09 | 1.09 | 1.06 | 1.16 | 1.03 | 1.13 | 1.10 | 1.00 |
| Snow performance | 6.00 | 6.00 | 5.87 | 6.00 | 6.00 | 5.70 | 5.50 | 5.50 |
| Ice performance | 100 | 100 | 98 | 100 | 100 | 96 | 95 | 95 |
| Noise level (dBA) | 69.8 | 68.4 | 68.2 | 68.0 | 68.5 | 67.8 | 68.2 | 68.2 |

*1) pitch lengths: S = 27.3 mm, L = 33.9 mm
pitch sequence: SSSSLLLLLLLSSSLLSLLLLLLLSSSLSSSLLLLLSSSSSLSSLLSSSSLLLLLLSLLSLLSS

The invention claimed is:

1. A pneumatic tire comprising a tread portion provided with a tread pattern comprising:
   a crown circumferential groove disposed on each side of the tire equator,
   a shoulder circumferential groove disposed axially outside each of said crown circumferential grooves,
   a circumferentially continuously extending center rib defined between the two crown circumferential grooves,
   a row of middle blocks defined between each of the two crown circumferential grooves and the two shoulder circumferential grooves, and circumferentially divided by middle axial grooves, and
   two rows of shoulder blocks defined between the two shoulder circumferential grooves and the tread edges and circumferentially divided by shoulder axial grooves, wherein
   a tread half which is one half of the tread pattern on each side of the tire equator is made up of repeat design units arranged circumferentially of the tire, wherein
   the repeat design units are defined by a circumferential-direction line drawn at the tire equator, a circumferential-direction line drawn at said tread edge, and pitch boundary lines drawn perpendicularly to the tire equator, passing through intersecting points of edges of said shoulder axial grooves on one side in a tire circumferential direction with said axially outermost shoulder circumferential groove,
   said repeat design units have at least two different circumferential pitch lengths, and said repeat design units are each provided with at least one stud hole for attaching a stud, wherein the stud holes disposed in said tread half include middle stud holes disposed on the middle blocks and shoulder stud holes disposed on the shoulder blocks, the middle stud holes include axially inner middle stud holes and axially outer middle stud, wherein the axially inner middle stud holes are each disposed on one of the middle blocks so that the center of the hole is positioned near or at the axial intermediate position of the middle block, the axially outer middle stud holes are each disposed on one of the middle blocks so that the center of the hole is positioned axially outside the axial intermediate position of the middle block, and the shoulder stud holes include axially inner shoulder stud holes and axially outer shoulder stud holes, wherein the axially inner shoulder stud holes are each disposed on one of the shoulder blocks so that the center of the hole is positioned axially inside the axial intermediate position of the shoulder block, the axially outer shoulder stud holes are each disposed on one of the shoulder blocks so that the center of the hole is positioned axially outside the axial intermediate position of the shoulder block, and wherein the number of the axially outer shoulder stud holes is less than the number of the axially inner shoulder stud holes which is more than the number of the axially outer middle stud holes and which is more than the number of the axially inner middle stud holes, the center rib is provided with a plurality of zigzag sipes, the middle blocks and the shoulder blocks are each provided with a plurality of zigzag sipes, the shoulder circumferential grooves extend substantially straight along a circumferential-direction line, and the crown circumferential groove extends zigzag on the tire circumferential direction.

2. The pneumatic tire according to claim 1, wherein the number of said repeat design units is in a range of from 56 to 64.

3. The pneumatic tire according to claim 1, wherein an average ground pressure Psh in a shoulder region between said shoulder circumferential groove and said tread edge is 1.2 to 1.4 times an average ground pressure Per in a crown region between the shoulder circumferential groove on one side of the tire equator and the shoulder circumferential groove on the other side of the tire equator.

4. The pneumatic tire according to claim 1, wherein the number of the stud holes disposed in one tread half is more than 1.0 times but not more than 1.1 times the number of the stud holes disposed in the other tread half.

5. The pneumatic tire according to claim 4, wherein the tread pattern excluding the stud holes and surrounding portions thereof is symmetry with respect to the tire equator or approximately symmetry with respect to the tire equator such that one tread half is circumferentially shifted from the other tread half.

6. The pneumatic tire according to claim 2, wherein an average ground pressure Psh in a shoulder region between said shoulder circumferential groove and said tread edge is 1.2 to 1.4 times an average ground pressure Per in a crown region between the shoulder circumferential groove on one side of the tire equator and the shoulder circumferential groove on the other side of the tire equator.

7. A pneumatic tire comprising a tread portion provided with a tread pattern comprising:

a crown circumferential groove disposed on each side of the tire equator, a shoulder circumferential groove disposed axially outside each of said crown circumferential grooves, a circumferentially continuously extending center rib defined between the two crown circumferential grooves, a row of middle blocks defined between each of the two crown circumferential grooves and the two shoulder circumferential grooves, and circumferentially divided by middle axial grooves, and two rows of shoulder blocks defined between the two shoulder circumferential grooves and the tread edges and circumferentially divided by shoulder axial grooves, wherein a tread half which is one half of the tread pattern on each side of the tire equator is made up of repeat design units arranged circumferentially of the tire, wherein the repeat design units are defined by a circumferential-direction line drawn at the tire equator, a circumferential-direction line drawn at said tread edge, and pitch boundary lines drawn perpendicularly to the tire equator, passing through intersecting points of edges of said shoulder axial grooves on one side in tire circumferential direction with said axially outermost shoulder circumferential groove, said repeat design units have at least two different circumferential pitch lengths, and said repeat design units are each provided with at least one stud hole for attaching a stud, wherein the stud holes disposed in said tread half include middle stud holes disposed on the middle blocks and shoulder stud holes disposed on the shoulder blocks, the middle stud holes include axially inner middle stud holes and axially outer middle stud holes, wherein the axially inner middle stud holes are each disposed on one of the middle blocks so that the center of the hole is positioned near or at the axial intermediate position of the middle block, the axially outer middle stud holes are each disposed on one of the middle blocks so that the center of the hole is positioned axially outside the axial intermediate position of the middle block, and the number of the axially outer middle stud holes is 1.05 to 1.1 times the number of the axially inner middle stud holes, the shoulder stud holes include axially inner shoulder stud holes and axially outer shoulder stud holes, wherein the axially inner shoulder stud holes are each disposed on one of the shoulder blocks so that the center of the hole is positioned axially inside the axial intermediate position of the shoulder block, the axially outer shoulder stud holes are each disposed on one of the shoulder blocks so that the center of the hole is positioned axially outside the axial intermediate position of the shoulder block, and the number of the axially inner shoulder stud holes is 1.05 to 1.2 times the number of the axially outer shoulder stud holes, and the number of the axially inner shoulder stud holes is 1.05 to 1.1 times the number of the axially outer middle stud holes, whereby the number of the axially outer shoulder stud holes is less than the number of the axially inner shoulder stud holes which is more than the number of the axially outer middle stud holes and which is more than the number of the axially inner middle stud holes, wherein the center rib is provided with a plurality of zigzag sipes, the middle blocks and the shoulder blocks are each provided with a plurality of zigzag sipes, the shoulder circumferential grooves extend substantially straight along a circumferential-direction line, and the crown circumferential groove extends zigzag in the tire circumferential direction.

8. The pneumatic tire according to claim 7, wherein the shoulder axial grooves extend substantially parallel with the tire axial direction at an angle of not more than 10 degrees with respect to the tire axial direction, and the middle axial grooves are inclined to one circumferential direction from the crown circumferential groove towards the shoulder circumferential groove.

9. The pneumatic tire according to claim 8, wherein the shoulder blocks each have an axially-long substantially-rectangular configuration, and the middle blocks 5B each have a substantially parallelogram configuration.

10. The pneumatic tire according to claim 1, wherein the center rib is provided with a plurality of zigzag sipes, the middle blocks and the shoulder blocks are each provided with a plurality of zigzag sipes, and each block with the stud hole is provided around the stud hole with a circular region in which no sipe is formed and outside of which the zigzag sipes are formed.

11. The pneumatic tire according to claim 1, wherein the center rib is provided with slots extending from the edges of the rib but terminate within the rib.

\* \* \* \* \*